Feb. 22, 1927.  1,618,600
K. N. MATTHEWS
PISTON
Filed Feb. 21, 1924   3 Sheets-Sheet 1

INVENTOR:
KINCHEN N. MATTHEWS
BY *A. E. Merkel,*
ATTORNEY

Feb. 22, 1927. 1,618,600

K. N. MATTHEWS

PISTON

Filed Feb. 21, 1924   3 Sheets-Sheet 2

INVENTOR:
KINCHEN N. MATTHEWS
BY
*A. E. Merkel,*
ATTORNEY

Patented Feb. 22, 1927.

1,618,600

UNITED STATES PATENT OFFICE.

KINCHEN N. MATTHEWS, OF CLEVELAND, OHIO.

PISTON.

Application filed February 21, 1924. Serial No. 694,412.

My invention relates to pistons, and particularly to the connection between a piston and the articulating end of a connecting rod.

The object of the invention is to provide an arrangement whereby the relation of the connecting rod to the piston may be adjusted to compensate for any departure from a perpendicular relationship between the axis of the cylinder and the axis of the crank shaft upon which the connecting rod is mounted.

The said invention consists of means hereinafter fully described and particularly set forth in the claims.

As is well known to those skilled in the art, the theoretically perfect relationship between the cylinder of an engine and the crank shaft is that in which the cylinder axis intersects the crank shaft axis at right angles. A departure from this theoretical relationship may, on account of imperfections in workmanship, occur in two ways; first, the axis of the cylinder may lie in a plane perpendicular to the axis of the crank shaft and yet not intersect the said crank shaft axis. This condition is compensated for by the fact that the upper end of the connecting rod oscillates on the wrist-pin axis so that the movement of the piston under these conditions is not improperly impeded. Second, the axis of the cylinder, while it may intersect the crank shaft axis, may, on account of such imperfections of workmanship, or by reason of later warping, wear or contortion, lie in a plane intersecting said crank shaft axis at an angle other than a right angle. When this latter condition occurs, there will be a binding action on the bearing on both ends of the connecting rod which will result in deleterious wear and consequent necessity for replacement of parts.

My invention, therefore, more specifically contemplates the provision of means whereby the piston may adjust itself with relation to the end of the connecting rod which articulates with the wrist-pin so as to compensate for this second described condition, and always maintain the coincidence of the cylinder and piston axes.

The annexed drawings and the following description set forth in detail certain means embodying my invention, the disclosed means, however, constituting but some of the various ways in which the principle of the invention may be employed.

In Figs. 1, 2, 3, and 4, I have illustrated my invention as applied specifically to the construction of the type of piston shown, described and claimed in the Turner Patents Nos. 1,312,879 and 1,312,880, and in my Patent No. 1,476,264, in which the piston consists of an inner core and a disconnectable outer skirt, whereby this skirt may be removed from the core in which the wrist-pin is mounted and withdrawn out of the top of the cylinder, for the purposes of repair, etc. This feature, therefore, need not be further described herein.

Figure 1:
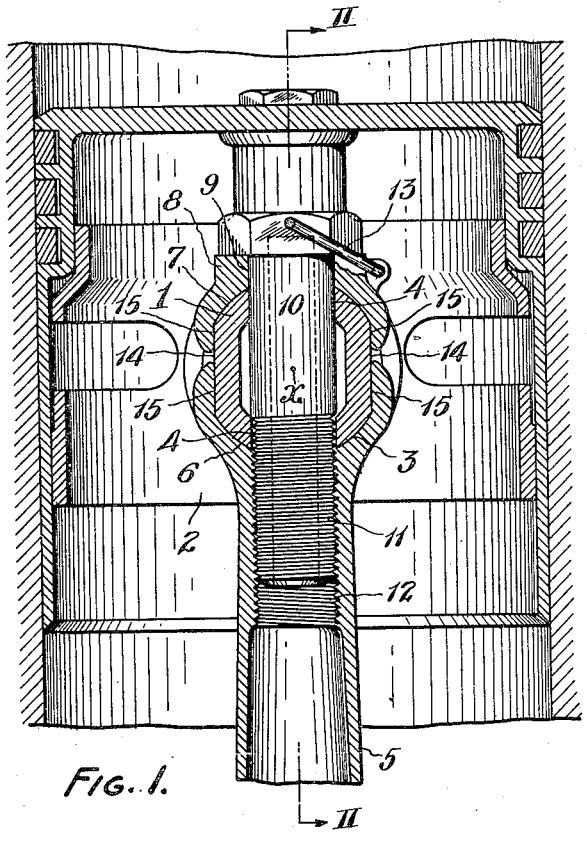
Figure 1 represents an axial cross-section of a piston, a fragmentary portion of a cylinder in which the piston is mounted, together with a fragmentary portion of the end of a connecting rod articulating with said piston, the plane of section being perpendicular to the axis of the crank shaft (not shown) on which the other end of the connecting rod articulates.
Figure 2:
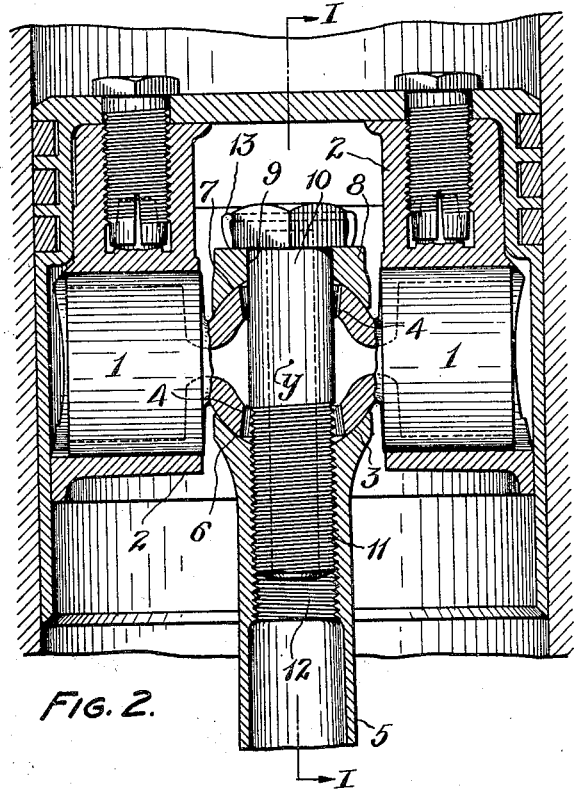
Fig. 2 represents a section taken upon the plane indicated by line II—II in Fig. 1.
Figure 3:
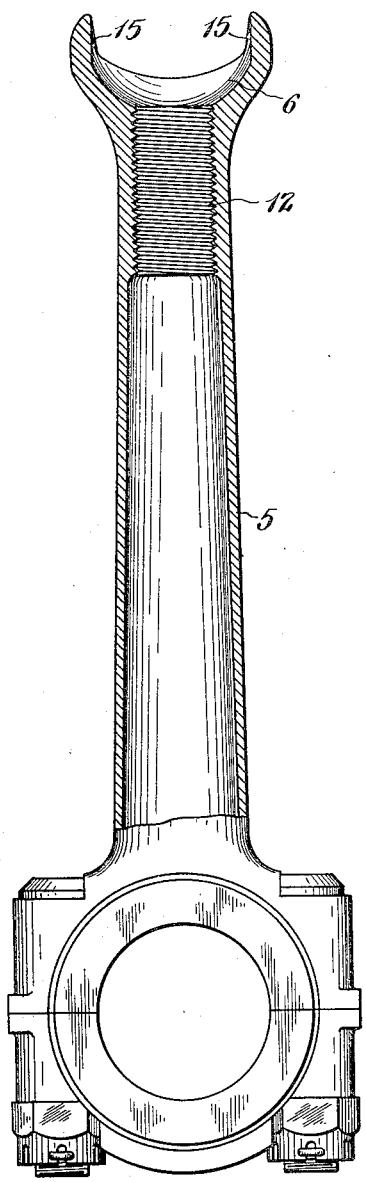
Fig. 3 represents an axial cross-section of a connecting rod forming part of my improved construction, showing the lower portion thereof in side elevation.

Referring first to the construction illustrated by Figs. 1 and 2, the wrist-pin 1, which is mounted, as described in the above mentioned patents, in the core 2, is formed with an intermediate spherical bearing portion 3. This latter is provided with a central opening 4 and articulates with the upper end of the connecting rod 5. The upper end of this connecting rod is provided with a spherical bearing surface 6 and a complementary surface 7 formed in a removable bearing cap 8. This cap is provided with a central aperture 9, through which a cap-screw 10 passes, the inner end of which is provided with threads 11 which engage internal threads 12 formed upon the interior of the upper end of the connecting rod 5. This cap-screw is locked in place by a suitable locking device 13 which may be of any desired form. The spherical bearing portion 3 of the wrist-pin is furthermore provided with two oppositely located flat surfaces 14—14, Fig. 1. These surfaces lie in two parallel planes which are parallel with the axis $x$ of the wrist-pin and cooperate with similar surfaces 15—15 formed in the connecting rod and bearing cap. The opening 4 is larger in diameter than the diameter of the screw 10, in the direction of the wrist-pin axis as shown in Fig. 2, so that the wrist-pin, and, hence, the piston, may move, with reference to the connecting rod, upon the axis $y$, Fig. 2, which is perpendicular to the wrist-pin axis and lies in a plane which is perpendicular to the piston axis.

When the parts are assembled, the piston will adjust itself upon the end of the connecting rod to compensate for any departure from the theoretically perfect position above described. The enlargement of the opening 4 allows the wrist-pin to oscillate during such adjustment.

The provision of the two flat parallel surfaces 14—14 prevents a relative movement between the upper end of the connecting rod and the wrist-pin and thus maintains parallelism between the wrist-pin and crank pin bearing and crank-shaft axes.

It will be noted from the above described construction that the connection between the wrist-pin and the connecting rod is made by means of a single screw whereby a simple, efficient and light construction is secured.

I prefer in practice to make the connecting rod and screw 10 hollow.

Figure 4:
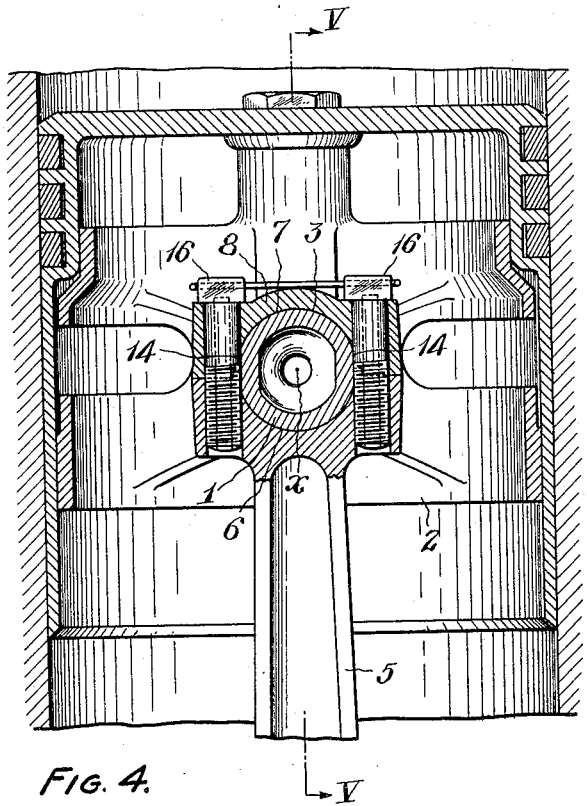
Fig. 4 represents a section similar to that of Fig. 1 and showing a modified construction embodying my invention.
Figure 6:
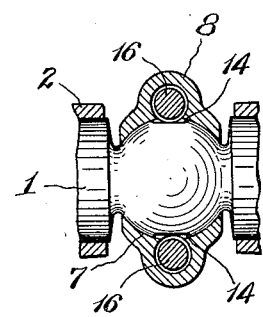
Fig. 6 represents a section taken upon the plane indicated by line VI—VI in Fig. 5.
Figure 5:
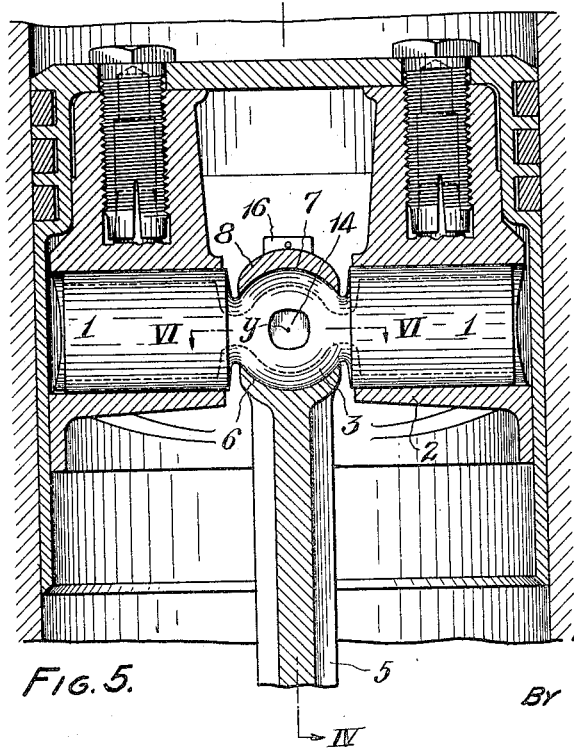
Fig. 5 represents a section taken upon the plane indicated by line V—V in Fig. 4.

In Figs. 4 and 5, I have shown a modification of the previously described structure wherein the central opening 4 in the bearing portion 3 of the wrist-pin is omitted. The upper end of the connecting rod is secured on this bearing portion by means of two cap-screws 16—16. These screws are so located that they engage the flat surfaces 14—14 and therefore take the place of the cooperating flat surfaces 15—15 in the said previously described structure. These two screws pass into the connecting rod from the top as is permissible in this type of piston wherein the skirt may be removed and thus expose the upper end of the connecting rod so as to enable the said screws to be screwed in position from the top.

Figure 7:
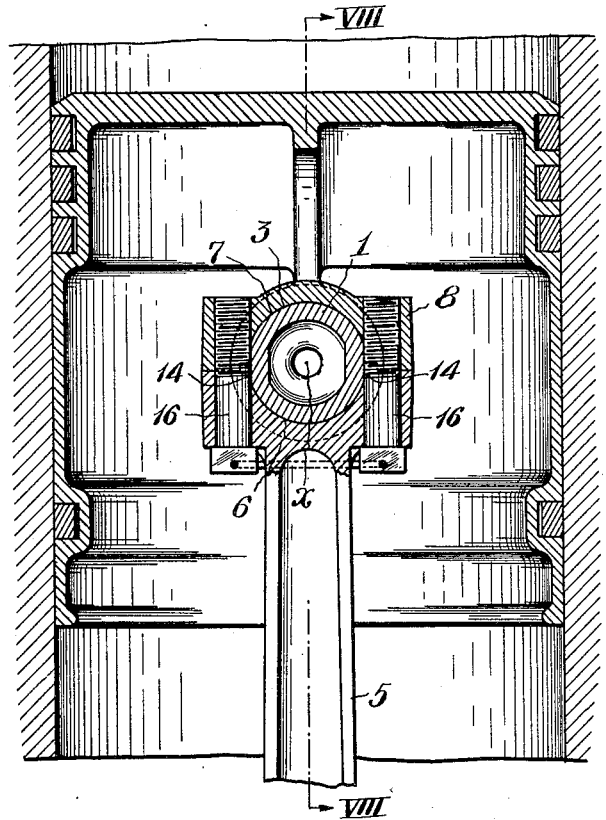
Fig. 7 represents a section similar to those in Figs. 1 and 4 and illustrating a second modification.
Figure 8:
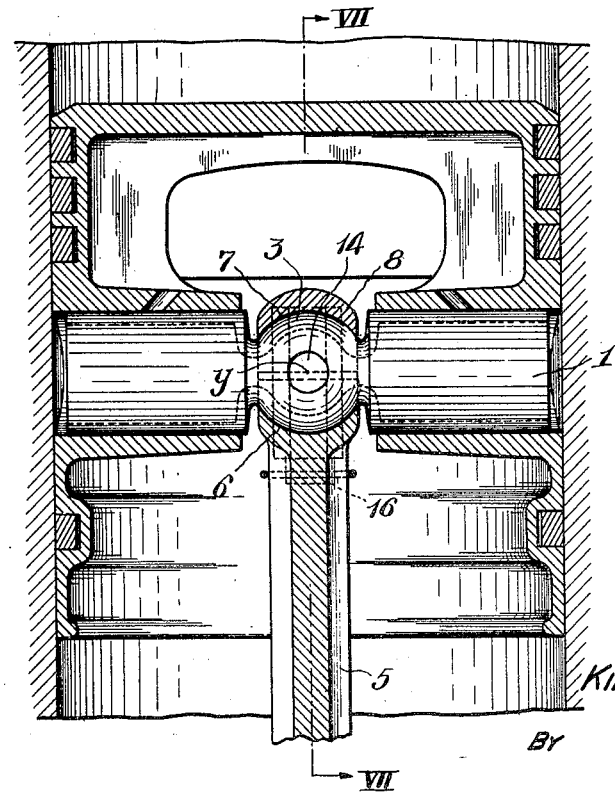
Fig. 8 represents a section taken upon the plane indicated by line VIII—VIII in Fig. 7.

Figs. 7 and 8 illustrate my invention as applied to an ordinary or common form of piston which consists of a single unitary skirt and whose interior must be reached from the bottom. In this case, the application of my invention is precisely similar to that illustrated by Figs. 4 and 5 excepting that the two screws 16—16 are put in from the bottom, all as will be readily understood by those skilled in the art.

What I claim is:

1. The combination of a piston; a wrist-pin mounted therein and having an intermediate journal portion; a connecting-rod having a bearing mounted upon said journal portion; the mounting being such as will permit the piston to be adjusted in a direction parallel with a plane at right angles to the plane of oscillation of the rod and containing the axis; said journal portion being provided with oppositely disposed flat sides lying in planes parallel with a plane containing the wrist-pin and piston axes.

2. The combination of a piston having a removable head portion; a wrist-pin mounted in said piston; a hollow connecting-rod having the upper end of its body-portion internally threaded and formed with a semi-bearing adapted to engage one side of said pin and a complementary semi-bearing portion for engaging the other side of said pin; and a single screw passing through said complementary bearing portion and said pin and engaging the internal threads of the upper end of the connecting-rod and body-portion.

Signed by me this 6th day of February, 1924.

KINCHEN N. MATTHEWS.